United States Patent [19]

Murayama et al.

[11] Patent Number: 4,974,093

[45] Date of Patent: Nov. 27, 1990

[54] SOLID STATE IMAGE-PICKUP DEVICE WITH EXPANDED DYNAMIC RANGE

[75] Inventors: Jin Murayama; Ryuji Kondo, both of Kanagawa, Japan

[73] Assignee: Fuji Photo Films Co., Ltd., Kanagawa, Japan

[21] Appl. No.: 288,068

[22] Filed: Dec. 22, 1988

[30] Foreign Application Priority Data

Dec. 22, 1987 [JP] Japan .................... 62-322844
Dec. 29, 1987 [JP] Japan ....................... 335601

[51] Int. Cl.$^5$ .................................. H04N 3/14
[52] U.S. Cl. ................ 358/213.19; 358/213.15
[58] Field of Search ............ 358/213.19, 213.13, 358/213.15, 213.18, 909

[56] References Cited

U.S. PATENT DOCUMENTS

| 4,335,405 | 6/1982 | Sakane et al. | 358/213.19 |
| 4,574,309 | 3/1986 | Arisawa et al. | 358/213.19 |
| 4,589,024 | 3/1986 | Koch et al. | 358/213.19 |
| 4,628,364 | 12/1986 | Koch | 358/213.19 |
| 4,835,617 | 5/1989 | Todaka et al. | 358/213.19 |

Primary Examiner—Stephen Brinich
Attorney, Agent, or Firm—Sughrue, Mion, Zinn, Macpeak & Seas

[57] ABSTRACT

A solid state image-pickup device having an expanded dynamic range so that light reception from a subject having a high light intensity can be carried out without saturation of the light receiving elements of the image-pickup device.

4 Claims, 6 Drawing Sheets

SOLID STATE IMAGE-PICKUP DEVICE WITH EXPANDED DYNAMIC RANGE

BACKGROUND OF THE INVENTION

The present invention relates to a solid state image-pickup device, and particularly to a solid state image-pickup device of the MOS-type and a solid state image-pickup device of the charge-storage-type. More particularly, the invention relates to a solid state image-pickup device in which a dynamic range is expanded so that light reception from a subject having a high luminous intensity can be made without saturation.

Figure 1:
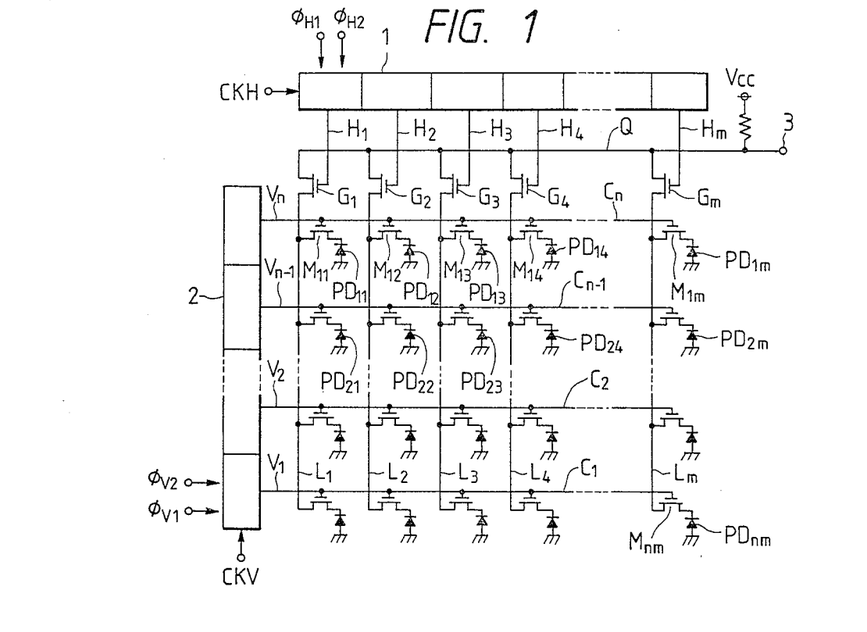
FIG. 1 is a block diagram showing an example of a conventional solid state image-pickup device of the MOS-type.

Conventionally, a solid state image-pickup device of the MOS-type as shown in FIG. 1 has been employed. As seen in the drawing, the solid state image-pickup device is arranged in a manner so that a plurality of photodiodes $PD_{11} \sim PD_{nm}$ are arranged in the form of a matrix. A plurality of vertically extending signal reading lines $L_1 \sim L_m$ and horizontally extending control-signal lines $C_1 \sim C_n$ are distributed so as to cross each other at positions of the respective photodiodes. Further, MOS switching elements $M_{11} \sim M_{nm}$ are provided to transfer signal charges of the respective photodiodes to predetermined ones of the signal-reading lines when they are made conductive by scanning signals from predetermined ones of the control-signal lines. The signal-reading lines $L_1 \sim L_m$ are connected at their terminals to a common output signal line Q through corresponding MOS switching elements $G_1 \sim G_m$, respectively. The on-off operation of the switching elements $G_1 \sim G_m$ is controlled by corresponding horizontal scanning signals $H_1 \sim H_m$, respectively, supplied from the respective output terminals of a horizontal shift register 1. On the other hand, the terminals of the control signal lines $C_1 \sim C_n$ are connected to the respective output terminals of a vertical shift register 2 and are supplied with vertical scanning signals $V_1 \sim V_n$, respectively.

Figure 2:
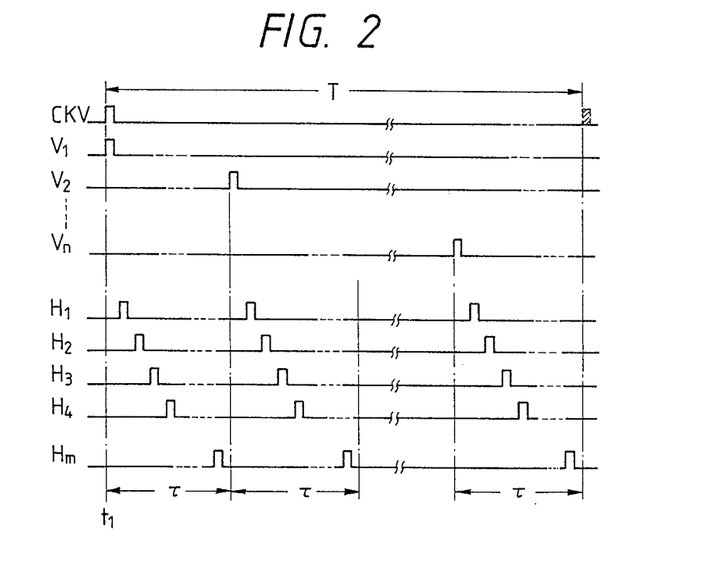
FIG. 2 is a timing chart for explaining the operation of the device of FIG. 1.

Referring to FIGS. 1 and 2, the operation of the solid state image-pickup device of the MOS-type will be described hereunder. First, a start signal CKV is supplied to the vertical shift register 2 (at a point of time $t_1$ in FIG. 2), and the signal CKV is succeedingly transferred in synchronism with synchronizing signals $\phi_{H1}$ and $\phi_{H2}$ each having a predetermined period so as to generate m pulses of horizontal scanning signals $H_1 \sim H_m$ in each period of $\tau$.

The switching elements $M_{11} \sim M_{nm}$ and $G_1 \sim G_m$ are controlled so as to be conductive/non-conductive at a predetermined timing in synchronism with the scanning signals $V_1 \sim V_n$ and $H_1 \sim H_m$, so that the signal charges generated in the respective photodiodes are outputted as a time series signal to an output terminal 3 through so-called horizontal and vertical scanning.

In such a conventional MOS solid state image-pickup device, however, there has been a problem in that in the case of taking a photograph of a subject having a high luminous intensity, the photodiodes are saturated so that a so-called dynamic range can not be sufficiently expanded.

Figure 3:
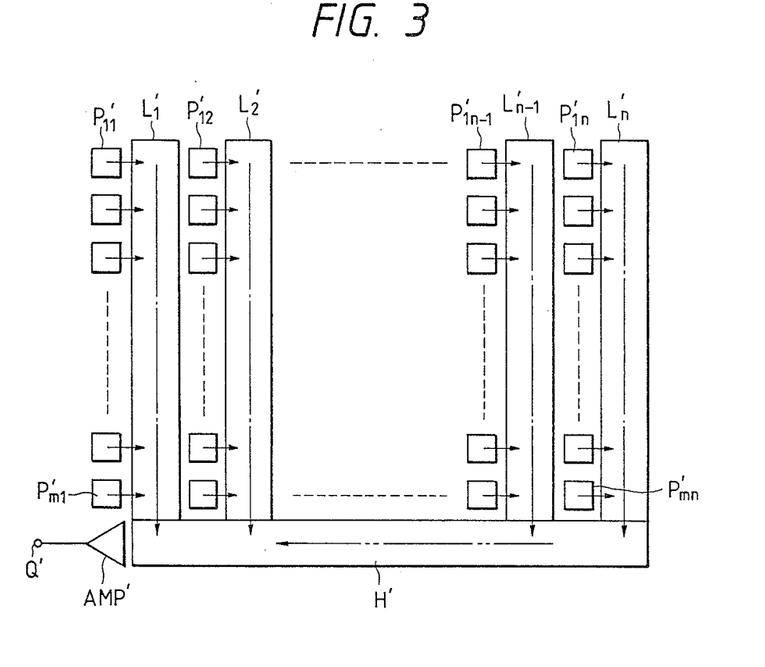
FIG. 3 is a block diagram showing an example of a conventional solid state image-pickup device of the charge-storage-type.

Conventionally, on the other hand, a solid state image-pickup device of the charge-storage-type having such an arrangement as shown in FIG. 3 has been employed. Referring to FIG. 3, first, the arrangement will be described. The image-pickup device is of a so-called inter-line transfer system in which a plurality of photodiodes $P_{11}' \sim P_{mn}'$ are arranged in the form of a matrix among a plurality of vertical transfer lines $L_1' \sim L_n'$. A horizontal transfer line H' is connected to the vertical transfer lines $P_{11}' \sim P_{mn}'$ at their terminals, and the terminal of the horizontal transfer line H' is connected to an output terminal Q' through an impedance conversion amplifier AMP'.

The operation will be described hereunder. First, the solid state image-pickup device is exposed to light for a predetermined time so as to generate signal charges in selected ones of the photodiodes $P_{11}' \sim P_{mn}'$, and the signal charges are transferred from the photodiodes $P_{11}' \sim P_{mn}'$ to corresponding ones of the vertical transfer lines $L_1' \sim L_n'$ opposite to the selected ones of the photodiodes $P_{11}' \sim P_{mn}'$ through transfer gates (not shown), respectively. Thus, the signal charges are transferred to predetermined pixels in the vertical transfer lines so as to be made transferable.

Next, driving signals of a so-called four-phase driving system or the like are applied to transfer electrodes (not shown) of the vertical transfer lines $L_1' \sim L_n'$, so that a row of signal charges generated in the horizontally arranged ones of the photodiodes are transferred to the horizontal transfer line H', and simultaneously all the signal charges are similarly shifted vertically. Succeedingly, the row of the signal charges on the horizontal transfer line H' are serially outputted from the horizontal transfer line H' to the output terminal Q' through the impedance conversion amplifier AMP'. The above operation in which one row of the horizontally aligned signal charges in the vertical transfer lines $L_1' \sim L_n'$ are outputted through the horizontal transfer line H' is repeated with respect to the whole of the signal charges, so that all of the signal charges can be outputted as a time series signal.

Figure 4:
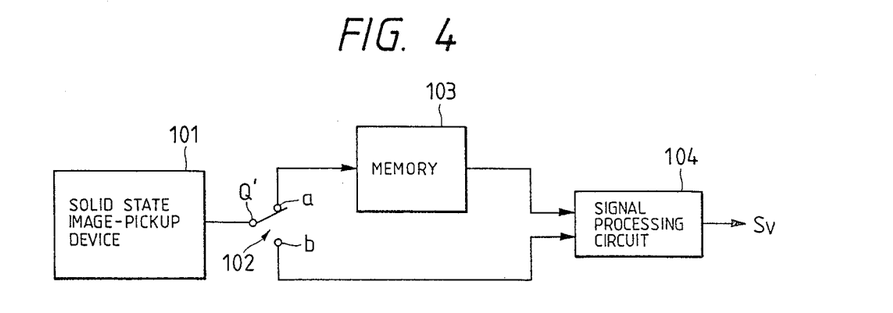
FIG. 4 is a system block diagram for explaining a method of improving a dynamic range in the conventional device of FIG. 3.

There has been proposed a method in which exposure and reading are carried out repeatedly, multiple times in order to obtain a wide dynamic range in a solid state image-pickup device having such an arrangement as described above. In order to realize the method, a system is constructed as shown in FIG. 4. In the system, a switching means 102 is connected at its movable contact to an output terminal Q' of a solid state image-pickup device 101 (corresponding to the solid state image-pickup device in FIG. 3). One fixed contact a of the switching means 102 is connected to one input terminal of a signal processing circuit 104 through a memory 103, while the other fixed contact b of the switching means 102 is connected directly to the other input terminal of the signal processing circuit 104.

Figure 5:
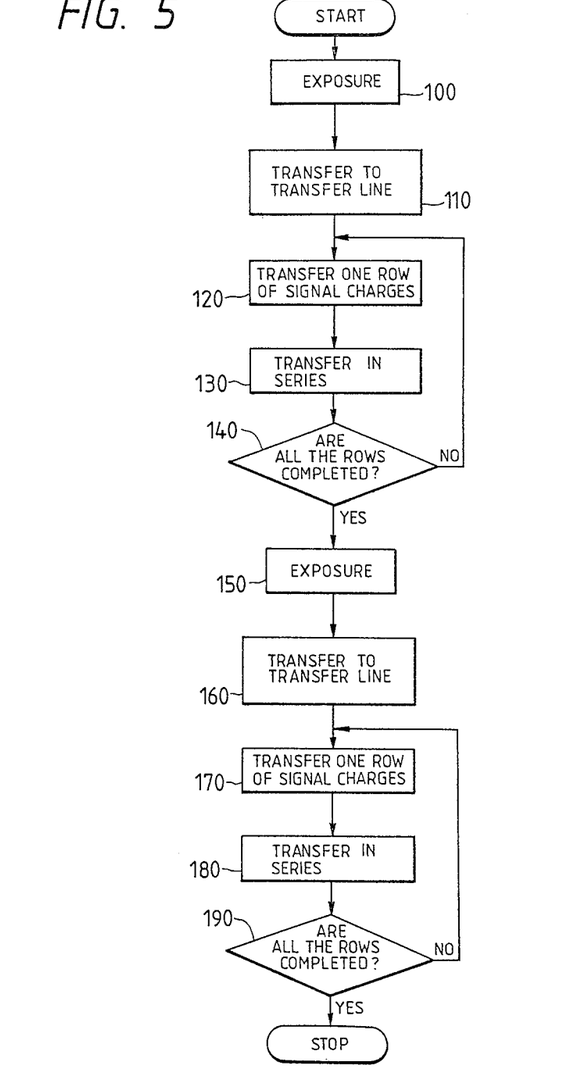
FIG. 5 is a flowchart for explaining the operation of the system in FIG. 4.

FIG. 5 is a flowchart showing the process of the case where the dynamic range is expanded through two exposure operations. In FIG. 5, first, a first time exposure is performed for a predetermined time $T_1$ in the condition where the movable arm of the switching means 102 is connected to the contact a in a routine 100. Then, signal charges generated in the respective photodiodes are transferred to the vertical transfer lines in a routine 110; one row of the signal charges are transferred to the horizontal transfer line in a routine 120; and the one row of signal charges are outputted as a time series signal to the horizontal transfer line in a routine 130, so that the one row of signal charges, that is, the time series signal, is stored in the memory 103. Next, if it is determined in a routine 140 that all the signal charges have not yet been completely outputted, the operation is shifted to the routine 120 again. Thus, the operation is repeated until all the signal charges have been completely outputted.

Upon completion of the outputting of all the signal charges (at this point of time, all the signals by the first time exposure have been stored in the memory 103), the movable arm of the switching means 102 is switched to the fixed contact b, and the operation is shifted to a routine 150 so as to perform a second time exposure. Processing similar to that in the routines 110 through 140 is performed in succeeding routines 160 through 190. In the case of the second time exposure, the output signal is supplied directly to the signal processing circuit 104, and the first time signal, previously stored in the memory 103, is supplied to the signal processing circuit 104 at a predetermined time. Accordingly, a video signal Sv such as a color difference signal and so on are formed in the signal processing circuit 104.

Thus, an image is picked up through the employment of multiple processing operations which are different in exposure time from each other, so that a subject having high luminous intensity can be photographed without making the photodiodes saturate to thereby make it possible to substantially expand the dynamic range.

However, such a dynamic-range expanding method has disadvantages for the following reasons. First, since the respective exposure operations are performed through signal reading operations, the exposure timing for the respective exposure operations may largely shift so that a subject may move during the multiple exposure times. At any rate, even if a picture is reproduced on the basis of an obtained video signal, the subject in the reproduced picture may be displaced. Further, there is another problem in that it is necessary to separately provide such a memory for temporarily storing signals as shown in FIG. 4.

SUMMARY OF THE INVENTION

It is therefore an object of the present invention to solve the above problems in the prior art.

It is another object to provide a solid state image-pickup device in which a wide dynamic range can be obtained so that an image of a subject of high light intensity can be picked up.

To attain the above objects, the solid state image-pickup device according to the present invention is arranged so that each of the pixels is constituted by at least one photodiode and separate switching circuits. This allows for outputting a signal charge generated in the at least one photodiode onto separate signal transfer paths. Further, the one photodiode and separate switching circuits constituting each pixel are arranged so that the signal charge generated in the pixel is transferred onto, exclusively, a selected one of the separate signal transfer paths through the switching circuits. Also, a period of light reception of the pixel is properly divided into a plurality of sub-periods such that the quantity of light reception of the photodiode in each of the sub-periods is set to a range in which the photodiode is not saturated. This thereby makes it possible to substantially expand the dynamic range.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Referring to the drawings, embodiments of the present invention will be described in detail hereunder.

First, referring to FIGS. 6 and 7, a first embodiment of the present invention which is applied to a solid state image-pickup device of the MOS-type will be described hereunder.

In the MOS-type solid state image-pickup device according to the first embodiment of the present invention, each pixel is constituted by at least one photodiode and a pair of switching circuits for outputting a signal charge generated in the photodiode onto separate signal-reading lines, respectively. Further, each photodiode is arranged so that the signal charge is transferred alternatively onto one of the separate signal-reading lines when one of the pair of switching circuits is made conductive, or onto the other one of the separate signal-reading lines when the other of the pair of switching circuits is made conductive. Also, a light receiving period is suitably divided into a plurality of sub-periods and the quantity of light reception in each sub-period is set within a range in which the photodiode is not saturated to thereby make it possible to substantially expand the dynamic range.

Figure 6:
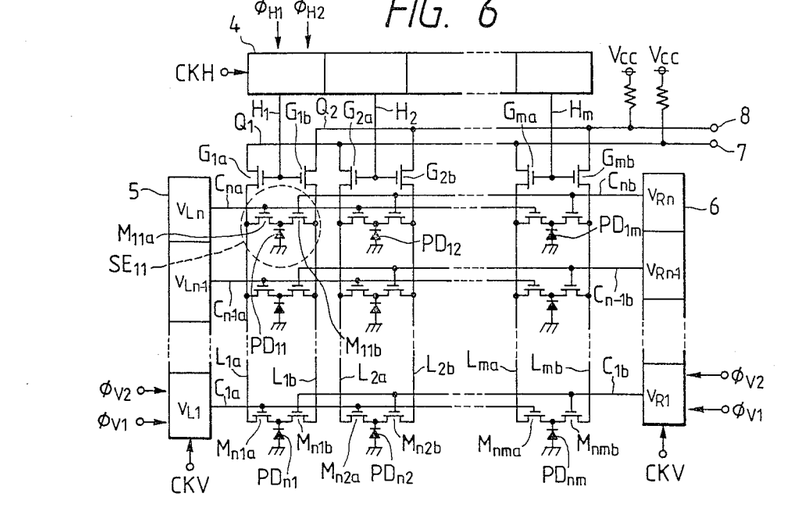
FIG. 6 is a block diagram showing an arrangement of an embodiment of the MOS-type solid state image-pickup device according to the present invention.
Figure 7:
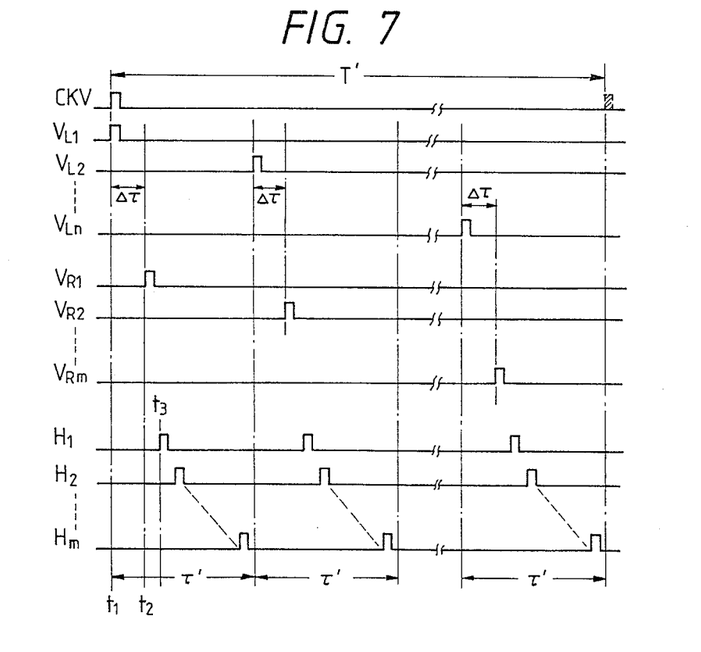
FIG. 7 is a timing chart for explaining the operation of the device shown in FIG. 6.

FIG. 6 is a block diagram schematically showing the arrangement of the whole device.

First, a feature different from the arrangement of FIG. 1 will be described. Each pixel is constituted by one photodiode and a pair of MOS switching elements. The arrangement of each pixel will be described with respect to an illustrated pixel $SE_{11}$ as a representative. Respective one nodes of a pair of switching elements $M_{11a}$ and $M_{11b}$ are connected to an output contact of a photodiode $PD_{11}$. Two vertically extended signal reading lines are distributed to every group of vertically arranged photodiodes. In the pixel $SE_{11}$, the other node of the one switching element $M_{11a}$ is connected to one of the two signal reading lines $L_{1a}$ and the other node of the other switching element $M_{11b}$ is connected to the other signal reading line $L_{1b}$.

Similarly to this, two horizontally extended control signal lines are distributed to every row of horizontally arranged picture elements. In the pixel $SE_{11}$, one and the other control signal lines $C_{na}$ and $C_{nb}$ are connected to the respective gates of the one and the other switching elements $M_{11a}$ and $M_{11b}$, respectively. Accordingly, if a signal of an "H" level is applied to the control signal line $C_{na}$, a signal charge generated in the photodiode $PD_{11}$ is transferred to the signal reading line $L_{11a}$, while if a signal in an "H" level is applied to the control signal line $C_{nb}$, the signal charge generated in the photodiode $PD_{11}$ is transferred to the signal reading line $L_{11b}$.

A terminal of the signal reading line $L_{1a}$ is connected to a signal output line $Q_1$ through an MOS switching element $G_{1a}$, while a terminal of the other signal reading line $L_{1b}$ is connected to a signal output line $Q_2$ through an MOS switching element $G_{1b}$. Gate contacts of the respective switching elements $G_{1a}$ and $G_{1b}$ are connected commonly to a predetermined output terminal of a horizontal shift register 4 and arranged to be supplied with a horizontal scanning signal $H_1$.

A terminal of the control signal line $C_{na}$ is connected to a predetermined output terminal of a first vertical shift register 5 located at the left in the drawing, while a terminal of the other control signal line $C_{nb}$ is connected to a predetermined output terminal of a second vertical shift register 6 located at the right in the drawing. If the horizontal scanning signal $H_1$ is at an "H" level, the switching elements $G_{1a}$ and $G_{1b}$ become conductive at the same time so that the signal charges transferred to the signal reading lines $L_{1a}$ and $L_{1b}$ are outputted onto predetermined output terminals 7 and 8 through the predetermined signal output lines $Q_1$ and $Q_2$, respectively.

Although the horizontal shift register 4 has the same arrangement and operation as that of the shift register 1 in FIG. 1, and the vertical shift registers 5 and 6 also have the same arrangement as that of the vertical shift register 2 in FIG. 1, output timings of the respective vertical scanning signals are different from that of the conventional example as described hereunder. Further, although the arrangement has been described with respect to the pixel $SE_{11}$ as a representative, the other pixels have the same arrangement as that of the pixel $SE_{11}$ and are connected to pairs of predetermined signal reading lines $L_{2a}$ and $L_{2b}$; $L_{3a}$ and $L_{3b}$; ... $L_{ma}$ and $L_{nb}$, respectively, and pairs of control signals lines $C_{1a}$ and $C_{1b}$; $C_{2a}$ and $C_{2b}$; ... $C_{n-1a}$ and $C_{n-1b}$, respectively, as shown in the drawing.

Referring to a timing chart of FIG. 7, the operation of the thus arranged solid state image-pickup device will be described hereunder.

For example, if a start signal CKV is applied to the first and second vertical shift registers 5 and 6 at a point of time $t_1$, the first shift register 5 first outputs a vertical scanning signal $V_{L1}$ from the first bit terminal of the register 5, and then the second shift register 6 outputs a vertical scanning signal $V_{R1}$ from the first bit terminal of the register 6 after the lapse of a predetermined delay of $\Delta\tau$ (at a point of time $t_2$). Ordinary horizontal scanning signals $H_1-H_m$ are outputted from the horizontal shift register 4 from a point of time $t_3$ after the further lapse of a predetermined time from the point of time $t_2$. In the operation during the period of time from $t_1$ to $t_3$, the switching elements $M_{n1a}$ through $M_{nma}$ are made conductive by the vertical scanning signal $V_{L1}$ so that the signal charges of the photodiodes are transferred to the signal reading lines $L_{1a}-L_{ma}$ (at the point of time $t_1$); the switching elements $M_{n1b}-M_{ma}$ are made conductive by the vertical scanning signal $V_{R1}$ at the point of time $t_2$ so that the signal charges of the photodiodes are transferred to the signal reading lines $L_{1b}-L_{mb}$; and the signal charges are outputted to the output terminals 7 and 8 similarly to the ordinary horizontal scanning from the point of time $t_3$. After completion of reading of one row of the horizontally arranged photodiodes (during the period of time $\tau'$ in the drawing), signal reading is carried out with respect to the succeeding row of the photodiodes. Through repetition of this operation with respect to all of the rows of pixels, the signal charges of all of the pixels can be outputted. In the drawing, T' represents a period of time for reading all of the pixels (one-frame reading period). Through repetition of the operation in the period T', it is possible to obtain a plurality of electronic still pictures or animations.

Through such reading and scanning, the signal charges generated in the respective photodiodes corresponding to light received by those photodiodes in a period corresponding to a phase difference in vertical scanning signal between the first and second vertical shift registers 5 and 6 (corresponding to the period $\Delta\tau$ in FIG. 7) are transferred to the output terminal 7 through the signal reading lines $L_{1a}-L_{ma}$ each attached with a suffix a, while the signal charges generated in the respective photodiodes corresponding to light received by those photodiodes in a period of ($T'-\Delta\tau$), that is a period obtained by subtracting the period $\Delta\tau$ from the one-frame reading period T', are transferred to the output terminal 8 through the signal reading lines $L_{1b}-L_{mb}$ each attached with a suffix b.

Even in the case where incident light is so strong that the photodiodes might be saturated in such a conventional solid state image-pickup device as shown in FIG. 1, it is possible to detect the signal charges of the photodiodes in the unsaturated state to thereby realize substantial expansion of the dynamic range in this embodiment if the signal charges are read through the output terminal 7 under the condition that the above period $\Delta\tau$ is suitably set. In the case where the incident light is weak, on the other hand, it is possible to detect signal charges in the unsaturated state, similarly to the above case, through the output terminal 8 under the condition that the period $\Delta\tau$ is selected to be zero or to be a properly small value.

As described above, in this embodiment, vertical shift registers are arranged so as to output vertical scanning signals with a predetermined phase difference therebetween to thereby make it possible to establish a maximum quantity of light reception of the photodiodes without saturation to thereby substantially expand the dynamic range by suitably setting the above-mentioned phase difference. Further, since there is no time displacement between the above-mentioned two light reception modes, there occurs no displacement in time between the signal outputted through the output terminals 7 and 8, and therefore there occurs no displacement in a picture when the picture is reproduced on the basis of those signals.

As described above, according to the present invention, since the period of light reception of each photodiode can be set suitably, the optimum dynamic range can be properly set both in the case where the incident light is strong and where it is weak so that the solid state image-pickup device of this embodiment can be widely applied to various fields for civil use, for industrial use, and so on.

Figure 8:
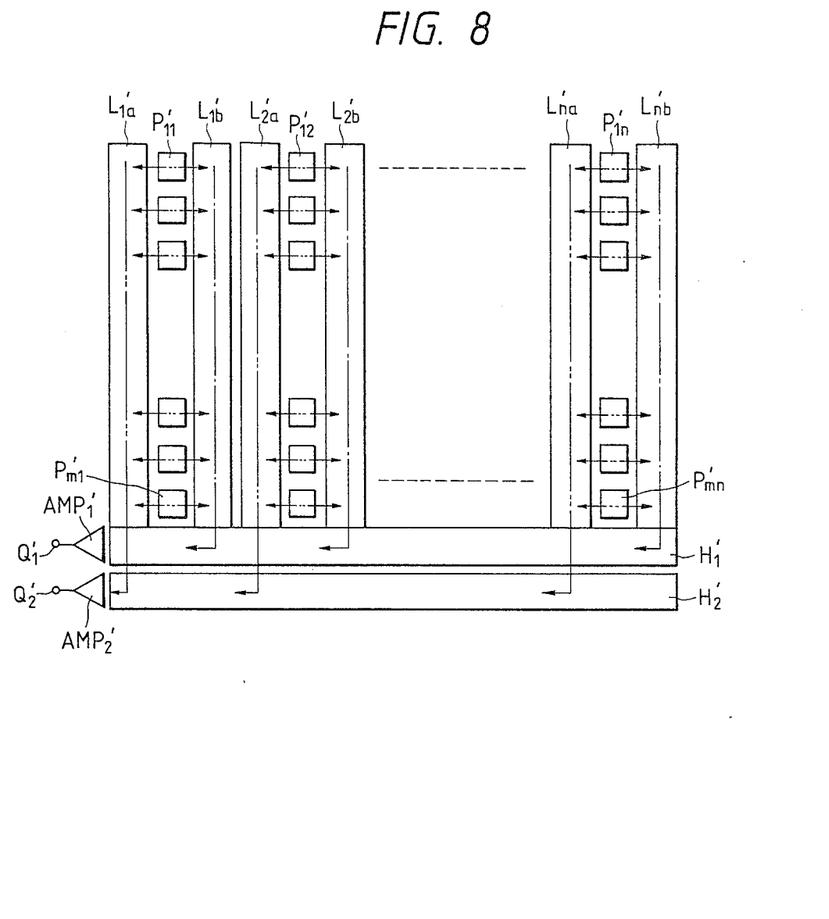
FIG. 8 is a block diagram showing an arrangement of an embodiment of the charge-storage-type solid state image-pickup device according to the present invention.
Figure 9:
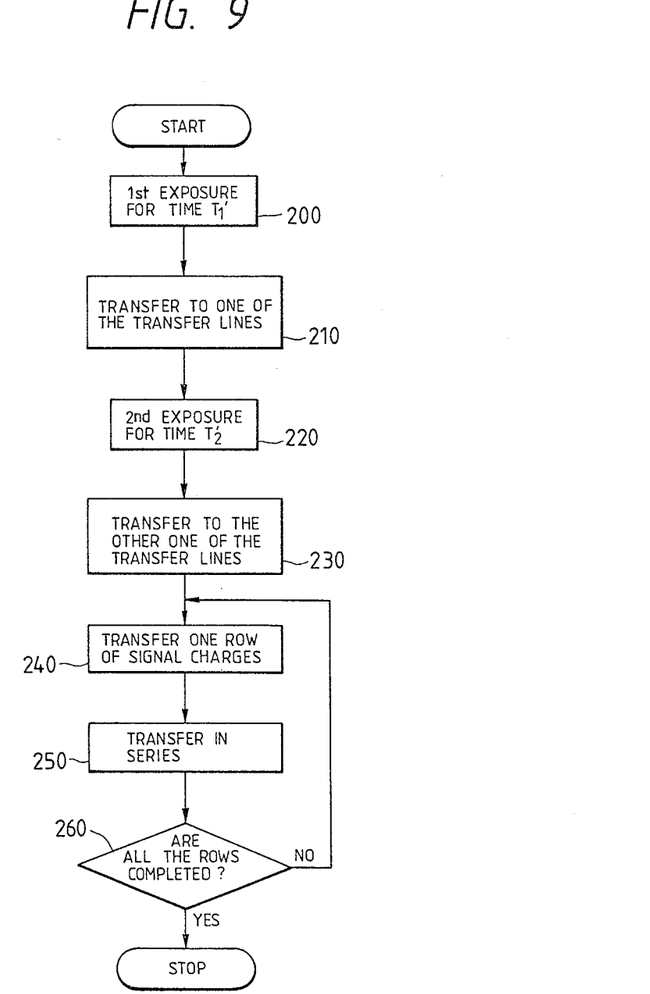
FIG. 9 is a flowchart for explaining the operation of the embodiment of FIG. 8.

Referring to FIGS. 8 and 9, description will be made with respect to a second embodiment in which the present invention is applied to a solid state image-pickup device of the charge-storage-type.

The charge-storage-type solid state image-pickup device according to the second embodiment of the present invention comprises: a plurality of light receiving elements arranged in the form of a matrix; vertical transfer lines for transferring signal charges generated in the light-receiving elements row by row at a predetermined timing; and horizontal transfer lines for receiving the signal charges transferred row by row from the vertical transfer lines onto the horizontal transfer lines.

The horizontal transfer lines are arranged to serially output the signal charges by row within each period of transfer of the signal charges of one row by the vertical transfer lines.

The vertical transfer lines are composed of a first group of vertical transfer lines and a second group of vertical transfer lines with the first and second groups of vertical transfer lines being arranged so that a pair of vertical transfer lines belonging to the first and second groups, respectively, are disposed on both sides of each of the vertically arranged columns of the light receiving elements.

The horizontal transfer lines are composed of a first horizontal transfer line for transferring signal charges transferred thereto from the first group of vertical transfer lines disposed on one side of the respective columns, and a second horizontal transfer line for transferring signal charges transferred thereto from the second group of vertical transfer lines disposed on the other side of the respective columns.

The device further comprises control means for causing the first horizontal transfer line to temporarily hold the signal charges generated through the first exposure, and for causing the first horizontal transfer line to output the held signal charges simultaneously with the outputting of the signal charges generated by the next exposure through the second horizontal transfer line. Thus, intervals between multiple exposure operations are made short to prevent displacement from occurring in the photographing of animations. Further, the dynamic range is expanded through the employment of multiple photographing operations to thereby make it possible to photograph a subject having a high intensity of light.

First, referring to FIG. 8, the arrangement of the charge-storage-type solid image-pickup device according to the second embodiment will be described.

A plurality of photodiodes $P_{11}'$ through $P_{mn}'$ are arranged in the form of a matrix, and pairs of columns of vertical transfer lines $L_{1a}'$ and $L_{1b}'$; $L_{2a}'$ and $L_{2b}'$ ..., and $L_{na}'$ and $L_{nb}'$ are formed in a manner so that each pair of the columns are located on the opposite sides of corresponding one of columns of vertically arranged photodiodes $P_{11}', P_{21}', P_{31}' \ldots P_{m1}'$; $P_{12}', P_{22}', P_{32}' \ldots P_{m2}'$; ...; and $P_{1n}', P_{2n}', P_{mn}'$.

A first horizontal transfer line $H_1'$ is connected to the respective terminals of the first group of columns of vertical transfer lines $L_{1a}', L_{2a}' \ldots$ and $L_{na}'$ located on the respective left sides of the columns of photodiodes, and a second horizontal transfer line $H_2'$ is connected to the respective terminals of the second group of columns of vertical transfer lines $L_{1b}', L_{2b}' \ldots$ and $L_{nb}'$ located on the respective right sides of all the columns of photodiodes. Since the horizontal transfer lines $H_1'$ and $H_2'$ are provided side-by-side on the same plane, it is necessary to cause the signal charges transferred from the above-mentioned first group of columns of vertical transfer lines $L_{1a}', L_{2a}', \ldots L_{na}'$ provided on the respective left sides of the columns of photodiodes to cross the first horizontal transfer line $H_1'$ in order to be transferred to the second horizontal transfer line $H_2'$. To this end, a conventionally known measure may be applied. The terminal of the first horizontal transfer line $H_1'$ is connected to an output terminal $Q_1'$ through an impedance conversion amplifier $AMP_1'$, while the terminal of the second horizontal transfer line $H_2'$ is connected to an output terminal $Q_2'$ through an impedance conversion amplifier $AMP_2'$.

The operation of the thus arranged solid state image-pickup device will be described hereunder. The description will be made with reference to the flowchart of FIG. 9 which corresponds to that shown in FIG. 5 so as to make the difference in operation between the device of this embodiment and the conventional one apparent.

In the case where exposure is carried out twice so as to expand a dynamic range, a first time exposure is performed for a predetermined time $T_1'$ in a routine 200, and signal charges generated in the respective photodiodes are transferred to corresponding pixels in the first group of columns of the vertical transfer lines $L_{1a}', L_{2a}', \ldots,$ and $L_{na}'$ provided on the respective left sides of the columns of the photodiodes through transfer gates (not shown) respectively in a routine 210. Next, a second time exposure is performed for a predetermined time $T_2'$ in a routine 220, and signal charges generated in the respective photodiodes are transferred to corresponding pixels in the second group of columns of the vertical transfer lines $L_{1b}', L_{2b}', \ldots,$ and $L_{nb}'$ provided on the respective right sides of the columns of the photodiodes through transfer gates (not shown).

Thus, after the signal charges generated in the two exposure operations, which are different in exposure time from each other, have been transferred to the first and second groups of columns of the vertical transfer lines, respectively, the operation is shifted to a routine 240. In the routine 240, one row of the horizontally arranged signal charges are transferred to the first and second horizontal transfer lines $H_1'$ and $H_2'$. That is, the signal charges located in the first row of the left side columns of vertical transfer lines $L_{1a}', L_{2a}', \ldots ,$ and $L_{na}'$ in FIG. 8 are transferred to the second horizontal transfer line $H_2'$ across the first horizontal transfer line $H_1'$, and simultaneously with this, the signal charges located in the first row of the right side columns of vertical transfer lines $L_{1b}', L_{2b}', \ldots ,$ and $L_{nb}'$ in FIG. 8 are transferred to the first transfer line $H_1'$. Succeedingly, the signal charges are outputted from the first and second horizontal transfer lines $H_1'$ and $H_2'$ to the respective output terminals $Q_1'$ and $Q_2'$ at the same timing in a routine 250. Next, if it is determined in the routine 250 that all the signal charges have not yet been completely outputted, the operation is shifted to the routine 240 again. Thus, the operation is repeated until all the signal charges have been completely outputted.

Thus, according to the embodiment, the double exposure can be carried out in an extremely short time without interposing any signal charge reading operation. Accordingly, it is possible to obtain a reproduced picture having no displacement even if an image of a moving subject is picked up. Further, since it is possible to carry out the double exposure with desirable set exposure times, respectively, it is possible to carry out the photographing of a subject having a high intensity of light to thereby substantially expand the dynamic range by dividing the period of exposure into a plurality of sub-periods with a maximum dynamic range in which the photodiodes are not saturated. As is apparent from the foregoing description, it is a matter of course that even in the case where the dynamic range is expanded, no displacement occurs in a reproduced picture with respect to a moving subject.

As described above, according to the embodiment, since signal charges generated in the light-receiving elements for every set of multiple exposure operations are read through independent charge-transfer lines, respectively, it is possible to perform image-pickup without saturating the light-receiving elements to thereby make it possible to expand the dynamic range while preventing signal displacement due to displacement in exposure time.

What is claimed is:

1. A solid state image-pickup device comprising a plurality of pixels arranged so that signal charges generated in said respective pixels are read out through horizontal and vertical transfer paths, each of said pixels further comprising:
    at least one photodiode and separate switching circuits for outputting the signal charge generated in said at least one photodiode onto separate signal transfer paths coupled to respective signal output terminals, wherein said at least one photodiode and separate switching circuits are arranged so that the signal charge generated in each said pixel is transferred onto a selected one of said separate signal transfer paths through said switching circuits, and further wherein a period of light reception of each said pixel is divided into a plurality of sub-periods so that said separate switching circuits are controlled so as to transfer a signal charge obtained in each said pixel within each of said sub-periods onto a corresponding one of said separate signal transfer paths to thereby provide an increased dynamic range.

2. A solid state image-pickup device of the MOS-type comprising a plurality of pixels arranged so that signal charges generated in said respective pixels are read out through horizontal and vertical scanning, each of said pixels further comprising:
    at least one photodiode and separate switching circuits for outputting the signal charge generated in said at least one photodiode onto separate signal reading lines coupled to respective signal output terminals; and
    a vertical scanning means for generating a first vertical scanning signal for making one of said switching circuits conductive such that said one switching circuit transfers the signal charge onto one of said separate signal reading lines and for generating a second vertical scanning signal for making the other one of said switching circuits conductive such that said the other switching circuit transfers the signal charge to the other one of said separate signal reading lines to thereby provide an increased dynamic range, wherein said vertical scanning means generates said first and second vertical scanning signals with a predetermined phase difference therebetween.

3. A solid state image-pickup device of the charge-storage-type comprising:
    a plurality of light-receiving elements arranged in the form of a matrix;
    vertical transfer lines for transferring signal charges generated in said light-receiving elements row by row at a predetermined timing;
    horizontal transfer lines for receiving said signal charges transferred row by row from said vertical transfer lines onto said horizontal transfer lines, said horizontal transfer lines being arranged to serially output a row of said signal charges within each period of transfer of said signal charges of said row by said vertical transfer lines;
    said vertical transfer lines further comprising a first group of vertical transfer lines and a second group of vertical transfer lines being arranged so that a pair of said vertical transfer lines belonging to said first and second groups, respectively, is disposed such that one of said pair is on one side and other of said pair is on the other side of each of a plurality of vertically arranged columns of said light receiving elements;
    said horizontal transfer lines comprising a first horizontal transfer line for transferring signal charges transferred thereto from said first group of vertical transfer lines disposed on one side of said respective columns, and a second horizontal transfer line for transferring signal charges transferred thereto from said second group of vertical transfer lines disposed on the other side of said respective columns; and
    control means for causing said first horizontal transfer line to temporarily hold signal charges generated by a first exposure, and for causing said first horizontal transfer line to output said held signal charges simultaneously with an outputting of signal charges generated by a subsequent exposure through said second horizontal transfer line.

4. The solid state image-pickup device of claim 3 wherein a period of light reception of each said light-receiving elements is divided into a plurality of sub-periods so that said transferring of signal charges is controlled so as to transfer a signal charge obtained in each said light-receiving element within each of said sub-periods onto a corresponding one of said vertical transfer lines.

* * * * *